US008499832B2

(12) United States Patent
Crews et al.

(10) Patent No.: US 8,499,832 B2
(45) Date of Patent: Aug. 6, 2013

(54) RE-USE OF SURFACTANT-CONTAINING FLUIDS

(75) Inventors: James B. Crews, Willis, TX (US); Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 278 days.

(21) Appl. No.: 12/971,557

(22) Filed: Dec. 17, 2010

(65) Prior Publication Data

US 2011/0108270 A1   May 12, 2011

Related U.S. Application Data

(63) Continuation-in-part of application No. 12/766,364, filed on Apr. 23, 2010, now Pat. No. 8,196,659, and a continuation-in-part of application No. 12/111,361, filed on Apr. 29, 2008, now Pat. No. 8,226,830, which is a continuation-in-part of application No. 12/180,111, filed on Jul. 25, 2008, now Pat. No. 7,703,531, which is a continuation-in-part of application No. 11/931,501, filed on Oct. 31, 2007, now Pat. No. 7,721,803, and a continuation-in-part of application No. 11/931,706, filed on Oct. 31, 2007, now abandoned, and a continuation-in-part of application No. 11/679,018, filed on Feb. 26, 2007, now Pat. No. 7,723,272, and a continuation-in-part of application No. 11/849,820, filed on Sep. 4, 2007, now Pat. No. 8,278,252, and a continuation-in-part of application No. 11/125,465, filed on May 10, 2005, now Pat. No. 7,343,972, said application No. 11/849,820 is a continuation-in-part of application No. 11/755,581, filed on May 30, 2007, now Pat. No. 7,550,413.

(60) Provisional application No. 61/288,761, filed on Dec. 21, 2009, provisional application No. 60/845,916, filed on Sep. 20, 2006, provisional application No. 60/570,601, filed on May 13, 2004, provisional application No. 60/815,693, filed on Jun. 22, 2006.

(51) Int. Cl.
*E21B 43/02*   (2006.01)
*E21B 43/27*   (2006.01)

(52) U.S. Cl.
USPC ........... 166/276; 166/278; 166/279; 166/307; 166/308.3; 166/311; 166/280.2

(58) Field of Classification Search
None
See application file for complete search history.

(56) References Cited

U.S. PATENT DOCUMENTS

| 4,643,831 | A | 2/1987 | Fletcher |
| 4,735,731 | A | 4/1988 | Rose et al. |
| 4,931,195 | A | 6/1990 | Cao et al. |
| 5,259,972 | A | 11/1993 | Miyamaru et al. |
| 5,518,996 | A | 5/1996 | Maroy et al. |
| 5,807,812 | A | 9/1998 | Smith et al. |
| 5,855,649 | A | 1/1999 | Durham et al. |
| 5,858,928 | A | 1/1999 | Aubert et al. |
| 5,964,295 | A | 10/1999 | Brown et al. |
| 6,211,120 | B1 | 4/2001 | Welch et al. |
| 6,258,859 | B1 | 7/2001 | Dahayanake et al. |
| 6,306,800 | B1 | 10/2001 | Samuel et al. |
| 6,447,577 | B1 | 9/2002 | Espin et al. |
| 6,506,710 | B1 | 1/2003 | Hoey et al. |
| 6,599,863 | B1 | 7/2003 | Palmer et al. |
| 6,605,570 | B2 | 8/2003 | Miller et al. |
| 6,613,720 | B1 | 9/2003 | Feraud et al. |
| 6,631,764 | B2 | 10/2003 | Parlar et al. |
| 6,805,198 | B2 | 10/2004 | Huang et al. |
| 6,821,434 | B1 | 11/2004 | Moore et al. |
| 6,838,005 | B2 | 1/2005 | Tepper et al. |
| 6,881,709 | B2 | 4/2005 | Nelson et al. |
| 6,919,029 | B2 | 7/2005 | Meng et al. |
| 7,036,585 | B2 | 5/2006 | Zhou et al. |
| 7,052,901 | B2 | 5/2006 | Crews |
| 7,060,661 | B2 | 6/2006 | Dobson, Sr. et al. |
| 7,081,439 | B2 | 7/2006 | Sullivan et al. |
| 7,084,095 | B2 | 8/2006 | Lee et al. |
| 7,131,491 | B2 | 11/2006 | Blauch et al. |
| 7,204,311 | B2 | 4/2007 | Welton et al. |

(Continued)

FOREIGN PATENT DOCUMENTS

WO   2008036812 A2   3/2008

OTHER PUBLICATIONS

J. Hibbeler, et al., "An Integrated Long-Term Solution for Migratory Fines Damages," SPE 81017, SPE Latin American and Caribbean Petroleum Engineering Conference, Apr. 27-30, 2003, pp. 1-11, Port-of-Spain, Trinidad, West Indies.
J. B. Crews, "Internal Phase Breaker Technology for Viscoelastic Surfactant Gelled Fluids," SPE 93449, 2005 SPE International Symposium on Oilfield Chemistry, Houston, Texas Feb. 2-4, 2005.
Schlumberger, "ClearFRAC HT Surfactant" Datasheet, Apr. 2005.
C. H. Bivins, et al., "New Fibers for Hydraulic Fracturing," Oilfield Review, Summer 2005, pp. 34-43.
Schlumberger, "ClearFRAC HiPerm Surfactant" Datasheet, Aug. 2005.
R. Gdanski, et al., "Fracture Face Skin Evolution During Cleanup," SPE 101083, 2006 SPE Annual Technical Conference and Exhibition, San Antonio, Texas, Sep. 24-27, 2006.

(Continued)

*Primary Examiner* — Zakiya W Bates
(74) *Attorney, Agent, or Firm* — Mossman Kumar & Tyler PC

(57) ABSTRACT

The components of surfactant-laden fluids, such as those used in hydrocarbon recovery operations such as for stimulation, e.g. hydraulic fracturing, may be re-used and re-cycled into components for subsequent use in a wide range of similar or different operational fluids. In particular, aqueous fluids gelled with viscoelastic surfactants and having components therein to pseudo-crosslink the elongated VES micelles and for internal breaking may be separated into its component parts by relatively inexpensive methods such as filtration. One filtration method includes contacting the surfactant-containing fluid with a particle pack having particulate additives therein which filter out or extract fine solids from the fluid. In an alternate embodiment the surfactant-laden fluid is a nano- and/or micro-emulsion wellbore cleanup fluid.

21 Claims, No Drawings

U.S. PATENT DOCUMENTS

| | | |
|---|---|---|
| 7,207,388 B2 | 4/2007 | Samuel et al. |
| 7,211,320 B1 | 5/2007 | Cooper et al. |
| 7,226,896 B2 | 6/2007 | Audibert-Hayet et al. |
| 7,258,170 B2 | 8/2007 | Nguyen et al. |
| 7,265,079 B2 | 9/2007 | Willberg et al. |
| 7,343,972 B2 | 3/2008 | Willingham et al. |
| 7,347,266 B2 | 3/2008 | Crews et al. |
| 7,550,413 B2 | 6/2009 | Huang et al. |
| 7,595,284 B2 | 9/2009 | Crews |
| 7,645,724 B2 | 1/2010 | Crews |
| 7,721,803 B2 | 5/2010 | Huang et al. |
| 7,723,272 B2 | 5/2010 | Crews et al. |
| 2001/0023849 A1 | 9/2001 | Robertson |
| 2003/0092581 A1 | 5/2003 | Crews |
| 2003/0134409 A1 | 7/2003 | Mallouk et al. |
| 2003/0234103 A1 | 12/2003 | Lee et al. |
| 2004/0106525 A1 | 6/2004 | Willberg et al. |
| 2004/0137209 A1 | 7/2004 | Zeller et al. |
| 2004/0152601 A1 | 8/2004 | Still et al. |
| 2005/0107265 A1 | 5/2005 | Sullivan et al. |
| 2005/0252658 A1 | 11/2005 | Willingham et al. |
| 2006/0027369 A1 | 2/2006 | Baycroft et al. |
| 2006/0041028 A1 | 2/2006 | Crews |
| 2006/0162928 A1 | 7/2006 | Collins et al. |
| 2006/0211775 A1 | 9/2006 | Crews |
| 2006/0211776 A1 | 9/2006 | Crews |
| 2006/0258541 A1 | 11/2006 | Crews |
| 2007/0056737 A1 | 3/2007 | Crews et al. |
| 2007/0125716 A1* | 6/2007 | Procter et al. ............ 210/708 |
| 2007/0175196 A1 | 8/2007 | Tepper et al. |
| 2008/0051302 A1 | 2/2008 | Crews et al. |
| 2008/0060812 A1 | 3/2008 | Huang et al. |
| 2008/0139419 A1 | 6/2008 | Huang |
| 2009/0107673 A1 | 4/2009 | Huang et al. |
| 2009/0266766 A1 | 10/2009 | Huang et al. |
| 2009/0312201 A1 | 12/2009 | Huang et al. |
| 2009/0312204 A1 | 12/2009 | Huang |
| 2010/0000734 A1 | 1/2010 | Huang et al. |
| 2010/0108613 A1 | 5/2010 | Crews et al. |
| 2010/0286000 A1 | 11/2010 | Huang et al. |

OTHER PUBLICATIONS

J. A. Ayoub, et al., "New Results Improve Fracture Cleanup Characterization and Damage Mitigation," SPE 102326, 2006 SPE Annual Technical Conference and Exhibition, San Antonio, Texas, Sep. 24-27, 2006.

H. A. Nasr-El-Din, et al., "Lessons Learned and Guidelines for Matrix Acidizing with Viscoelastic Surfactants," SPE 102468, 2006 SPE Annual Technical Conference and Exhibition, San Antonio, Texas, Sep. 24-27, 2006.

H. A. Nasr-El-Din, et al., "Acid Fracturing of Deep Gas Wells Using a Surfactant-Based Acid: Long-Term Effects on Gas Production Rate," SPE 102469, 2006 SPE Annual Technical Conference and Exhibition, San Antonio, Texas, Sep. 24-27, 2006.

P. D. Nguyen, et al., "Controlling Formation Fines at Their Sources to Maintain Well Productivity," SPE 97659, SPE International Improved Oil Recovery Conference in Asia Pacific, Kuala Lumpur, Dec. 5-6, 2005; republished SPE Production & Operations, May 2007, pp. 202-215.

T. Huang, et al., "Nanotechnology Applications in Viscoelastic Surfactant Stimulation Fluids," SPE 107728, European Formation Damage Conference, Scheveningen, The Netherlands, 30 May 30-Jun. 1, 2007.

Clearfrac HT Web page, 2007, available at http://www.slb.com/content/services/stimulation/fracturing/clearfrac_ht.asp?.

Clearfrac HT Web page, 2007, available at http://www.slb.com/content/services/stimulation/fracturing/clearfrac_hiperm.asp?.

C. Lu, et al., "Chemical Modification of Multiwalled Carbon Nanotubes for Sorption of $Zn^{2+}$ from Aqueous Solution," Chem. Engr. Jrnl, 2008, pp. 462-468, vol. 139.

A.T. Heitsch, et al., "Multifunctional Particles: Magnetic Nanocrystals and Gold Nanorods Coated With Fluorescent Dye-dopedSilica Shells," Jrnl of Solid State Chem., 2008, pp. 1590-1599, vol. 191.

Martin Marietta Magnesia Specialties LLC, "THIOGUARD Brochure," available at http://www.magnesiaspecialties.com/Thioguard/thio_PDF/Thioguard.pdf.

C. Babe, et al., "New Insight to Desulfurization Process: Geometric Modeling of the Sulfidation of ZnO by H2S," Prepr. Pap.-Am. Chem. Soc., Div. Petr. Chem. 2007, vol. 52, No. 2, pp. 31-34.

J. V. Stark, et al., "Nanoscale Metal Oxide Particles/Clusters as Chemical Reagents. Unique Surface Chemistry on Magnesium Oxide as Shown by Enhanced Adsorption of Acid Gases (Sulfur Dioxide and Carbon Dioxide) and Pressure Dependence," Am. Chem. Soc., Chem. Mater. 1996, vol. 8, pp. 1904-1912.

Y. Ding, et al., "Nanoscale Magnesium Hydroxide and Magnesium Oxide Powders: Control over Size, Shape and Structure via Hydrothermal Synthesis," Am. Chem. Soc., Chem. Mater. 2001, vol. 13, pp. 435-440.

* cited by examiner

RE-USE OF SURFACTANT-CONTAINING FLUIDS

CROSS-REFERENCES TO RELATED APPLICATIONS

This application claims the benefit of U.S. Provisional Patent Application No. 61/288,761 filed Dec. 21, 2009 and further is a continuation-in-part application of U.S. Ser. No. 12/111,361 filed Apr. 29, 2008, issued Jul. 24, 2012 as U.S. Pat. No. 8,226,830, and is also a continuation-in-part application of U.S. Ser. No. 12/766,364 filed Apr. 23, 2010, issued Jun. 12, 2012 as U.S. Pat. No. 8,196,659, which is a continuation-in-part application of U.S. Ser. No. 12/180,111 filed Jul. 25, 2008 issued Apr. 27, 2010 as U.S. Pat. No. 7,703,531, which is a continuation-in-part application of U.S. Ser. No. 11/931,501 filed Oct. 31, 2007 issued May 25, 2010 as U.S. Pat. No. 7,721,803; U.S. Ser. No. 11/931,706 filed Oct. 31, 2007 now abandoned; U.S. Ser. No. 11/679,018 filed Feb. 26, 2007 issued May 25, 2010 as U.S. Pat. No. 7,723,272; and U.S. Ser. No. 11/849,820 filed Sep. 4, 2007, issued Oct. 20, 2012 as U.S. Pat. No. 8,278,252, the latter which claims the benefit of U.S. Provisional Patent Application 60/845,916 filed Sep. 20, 2006, and in turn is a continuation-in-part application of U.S. Ser. No. 11/125,465 filed May 10, 2005 issued Mar. 18, 2008 as U.S. Pat. No. 7,343,972, which in turn claims the benefit of U.S. Provisional Patent Application 60/570,601 filed May 13, 2004, and is a continuation-in-part application of U.S. Ser. No. 11/755,581 filed May 30, 2007 issued Jun. 23, 2009 as U.S. Pat. No. 7,550,413, which in turn claims the benefit of U.S. Provisional Patent Application 60/815,693 filed Jun. 22, 2006.

TECHNICAL FIELD

The present invention relates to methods and compositions for re-using the components of fluids containing surfactants and other components, and more particularly relates, in one non-limiting embodiment, to methods and compositions for separating out and re-using the components of surfactant-containing fluids, such as by passing the fluid through a particle pack to filter at least one component therefrom.

BACKGROUND

Operational fluids are well known to be used in a variety of functions, including, but not necessarily limited to, hydrocarbon recovery operations. For instance, the DIAMOND FRAQ™ fluid system available from Baker Oil Tools is a water-based fluid that is gelled or has its viscosity increased using a non-ionic viscoelastic surfactant (VES). This fluid is designed for hydraulic fracturing of oil and dry gas sandstone reservoirs where minimizing formation damage and maximizing proppant and gravel pack gravel retained permeability is of importance. The DIAMOND FRAQ™ fluid system contains additives for pseudo-crosslinking the elongated VES micelles that give the fluid its viscosity, as well as internal breakers for reducing the viscosity of the fluid after fracturing is complete. CLEAR-FRAC is a polymer free fracturing fluid available from Schlumberger that also contains viscoelastic surfactants.

Other surfactant-laden fluids for use in hydrocarbon recovery operations include, but are not necessarily limited to, Baker Hughes Drilling Fluids' MICRO-WASH™ High Definition Remediation (HDR) system which are used to treat badly damaged reservoirs, where production or injection rates often decline to the point where the well is no longer a viable asset. Many of these reservoirs have been damaged by natural emulsions, fine particles or interaction with oil based drill-in fluids. Regardless, the end result is often a shortfall in production and lack of return on investment.

The Baker Hughes Drilling Fluids MICRO-PRIME™ spacer system is technology designed to optimize the wellbore clean-up process when displacing drilling fluids are used prior to the completion process. A proficient wellbore cleanup is required since the removal of mud and solids is essential to the successful completion of the well. This spacer system utilizes advanced mesophase technology that will clean and water-wet all surfaces, even at high levels of oil- or synthetic-based mud contamination. The MICRO-PRIME™ spacer system also contains surfactants, and thus like the other surfactant-containing fluids discussed may benefit from a method for reclaiming some or all of the components therein.

Many methods and processes are known to clean, purify, clarify and otherwise treat fluids for separating the components thereof for re-use, proper disposal of components that cannot be re-used, consumption, use, and other needs. These methods include, but are not necessarily limited to, centrifugation and filtration to remove particulates, chemical treatments to sterilize water, distillation to purify liquids, decanting to separate two phases of fluids, reverse osmosis to desalinate liquids, electrodialysis to desalinate liquids, pasteurization to sterilize foodstuffs, and catalytic processes to covert undesirable reactants into useful products. Each of these methods is well-suited for particular applications and typically a combination of methods is used to reclaim or recover the components of the fluid.

Industrial liquids containing viscoelastic surfactant compositions can be reversibly thickened and broken according to U.S. Pat. No. 4,735,731. For example, a thickened industrial liquid can exhibit good solids carrying capacity, and after the viscosity of the liquid is broken, using techniques such as change in pH, addition of a hydrocarbon, change in temperature, etc., the solids can be easily removed therefrom. Viscosity can be again provided to the industrial liquid without the necessity of adding substantial amounts of additional thickener. Removal of solids from liquids by filtering to reuse the liquid or use the solids is disclosed.

It has also been discovered that nanoparticle-treated particle packs, such as sand beds, may effectively filter and purify liquids such as waste water. These packs and beds and methods for using them are described in U.S. Patent Application Publication No. 2009/0266766 (the parent application hereto), incorporated by reference herein in its entirety. When tiny contaminant particles in waste water flow through the particle pack, the nanoparticles in the pack will capture and hold the tiny contaminant particles within the pack due to the nanoparticles' surface forces, including, but not necessarily limited to, van der Waals and electrostatic forces. Coating agents such as water, brine, alcohols, glycols, polyols, solvents, vegetable oil, and mineral oils may help apply the nanoparticles to the particle surfaces in the filter beds or packs.

However, it would be advantageous if surfactant-laden fluids that have been used once may be re-used and the components re-cycled in similar or different fluids with subsequent utility.

SUMMARY

There is provided, in one non-limiting form, a method for filtering a fluid comprising water, at least one surfactant and fine solids, where the method includes contacting the fluid with substrate particles bearing or supporting comparatively smaller particulate additives thereon. The substrate particles (with the particulate additives thereon) are optionally formed into a particle pack, such as a sand bed, in one non-limiting embodiment. At least a portion of the fine solids would be removed therefrom to give a filtered fluid containing the surfactant. The particulate additives are present in an amount effective to remove at least a portion of the fine solids.

Representative but non-restrictive forms of the particle packs for purifying fluids include a plurality of substrate particles that have been treated with a particulate additive, which are comparatively or relatively smaller than the substrate particles. The particles in the particle pack may include, but are not necessarily limited to, sand, gravel, ceramic beads, glass beads, and combinations thereof. The particulate additive may have a mean particle size of 1000 nm or less, and are therefore sometimes called nanoparticles or nanoparticulates. The nano-particulate additive may include, but not necessarily be limited to, alkaline earth metal oxides, alkaline earth metal hydroxides, transition metal oxides, transition metal hydroxides, post-transition metal oxides, post-transition metal hydroxides, piezoelectric crystals, and/or pyroelectric crystals. The nanoparticles may be present in an amount ranging from about 1 part particulate additive for 200 to 5000 parts by weight of substrate particles in the particle pack.

The particulate additives, also referred to herein as nano-sized particles or nanoparticles (e.g. MgO and/or $Mg(OH)_2$, and the like), appear to fixate, bind up, or otherwise capture the fine solids in the surfactant-laden fluid, such as clay and non-clay particles, including charged and non-charged particles, and organic and inorganic particles. Due to at least in part to their small size, the surface forces (e.g. van der Waals and electrostatic forces) of the nanoparticles help them associate, group or flocculate the tiny fine solids together in larger collections, associations or agglomerations, which are retained in the particle pack. These surface forces are large relative to the small volumes of the particulate additives. Such groupings or associations help capture the fine solids and contaminants in place and keep them from moving and passing through with the liquid, resulting in a separated liquid, which nevertheless still contains the surfactant. Thus, in many cases, the filtering or separating ability of the particle pack may be improved by use of nano-sized particulate additives that may be relatively much smaller in size than the fine solids filtered out.

The addition of alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; post-transition metal hydroxides; piezoelectric crystals and/or pyroelectric crystals such as ZnO and $AlPO_4$, to an aqueous fluid, a solvent-based fluid such as glycol, or oil-base fluid, e.g. mineral oil, may be used to treat the substrate particles, such as a sand bed to create a particle pack, which in turn is expected to filter and separate out the fine solids of the surfactant-laden fluid passing through it.

DETAILED DESCRIPTION

It has been discovered that surfactant-laden fluids, such as the DIAMOND FRAQ™ fluid system gelled with a VES and containing internal breakers and additives to pseudo-crosslink the elongated VES micelles to further enhance the viscosity created by the VES, may be reusable. The agents added to the VES fluid may be separated from a recovered VES-gelled fluid, particularly by inexpensive methods of filtration. For example, the internal breakers such as mineral oil products may be selectively removed by filtration from a recovered DIAMOND FRAQ™ fluid system, where upon removal, the VES containing fluid may be returned for use again. This method of use may be particularly economical for frac-packs and conventional fracturing, where large volumes of VES-containing fluids are used. The VES fluid may be polished further to remove other solids and hydrocarbons, if needed. The re-use may possibly be more selectively economical where repeated fracturing treatments on the same well will be performed, and/or for nearby wells to be hydraulically fractured. This technology differs from previous methods by allowing the internal breakers and pseudo-crosslinking particles to perform their particular function, and where the broken VES fluid is made more readily recoverable from the treated reservoir, that is, it is in its broken state of water-like viscosity. Yet the agents, such as internal breakers, may be readily absorbed out by selective filtration to allow the VES-containing fluid to be re-used.

Similarly, other surfactant-containing fluids such as ClearFRAC™ fracturing fluid, ClearPAC™ gravel pack fluid, MICRO-WASH™ High Definition Remediation (HDR) system, and MICRO-PRIME™ spacer system may also have their components recovered and processed and engineered to have a wider range of re-use. Like VES-containing fluids, a large amount of surfactants are present in the flowback fluid from the use of the MICRO-WASH™ and the MICRO-PRIME™ systems, yet these are not viscoelastic fluids but watery cleanup fluids. In other non-limiting examples, wellbore and formation solids and other components may be removed from fluid loss control pills, gravel packing fluids, drilling fluids, wellbore and formation clean-up fluids, self-diverting acids, acid diverter fluids, downhole equipment cleanup fluids, cementing spacers, coiled tubing washes, and the like fluid systems containing surfactant. Various methods of filtration and separation may be used to re-condition these fluids. Additional components may then be added prior to re-use according to known methods and technologies. Engineering re-use of surfactant-laden fluids may also help reduce the net cost and environmental disposal concerns for operators. That is, less total material need be ultimately disposed of.

The methods described herein may also be used to filter fluids containing surfactants where the surfactant is different from a viscoelastic surfactant, for instance, a detergent. Such aqueous fluids containing detergents and fine solids (the latter of which are to be removed) include, but are not necessarily limited to wellbore fluids, reservoir cleanup fluids, and the like. The surfactant may alternatively be or additionally be or additionally include emulsifiers.

Filtration may or may not be a method for conditioning the fluid for re-use, but in most cases is expected to be a part of conditioning by removing fine solids that may create formation damage. In particular, any formation fines that may create formation damage in a subsequent treatment or application may be removed. Using nano-sized particles to fixate formation fines within a subterranean formation is disclosed in U.S. Patent Application Publication No. 2009/0312201, hereby incorporated by reference in its entirety. A somewhat related technology to fixate formation fines within proppant packs using nano-sized particle-coated proppants is disclosed in U.S. Pat. No. 7,721,803, also hereby incorporated by reference in its entirety.

The methods herein may use filtration mechanisms like those described in the immediately previous paragraph on packs or beds of sand, ceramic particles or diatomaceous earth (DE unit). For example, if a filtration method of nanoparticle fixation of fine solids-type is used, a nano- and/or micro-emulsion surfactant-laden flowback fluid may have a changed composition. For instance, removing components possibly added to the fluid during use as a drilling mud cleanup fluid (e.g. bentonite, calcium carbonate, and barite). The nano- and/or micro-emulsion components may be "engineered" or re-formulated into fluids for other applications at the well site including, but not limited to, a) second use as a spacer/wash ahead of cement during cementing casing; b) adding acid and using the resulting composition as a matrix acidizing fluid; c) adding acid and using the resulting composition for acid fracturing carbonate reservoirs; d) adding acid and using the resulting fluid when perforating to help open up the perforations and the near wellbore region (or just be a fluid that is easier to flow back after an over-balanced perforating operation); e) diluting the fluid, and using the resulting composition as a slickwater; or f) as a preflush and/or a postflush ahead of and/or behind, respectively, of a crosslinked polymer fluid or VES fluid treatment. (Slickwater may be used as a lower-friction-pressure placement fluid or for slick water fracturing, any of which involves adding chemicals to increase the fluid flow and fluid recovery; formulating the slickwater may involve injecting one or more components such as friction reducers, fluid loss control agents, viscosifiers, viscosity breakers, biocides, clay stabilizers, surfactants, microemulsions, and scale inhibitors.) Generally, these are "engineering re-use" applications.

Alternatively, in some embodiments, even those using a viscoelastic surfactant to gel the fluid, it is not necessary to have an internal breaker to break the fluid, that is, there is an absence of internal breaker. Such fluids may be broken by dilution with aqueous fluids from the formation or otherwise, or by contact with formation hydrocarbons, or by some other method.

As previously discussed, U.S. Pat. No. 7,721,803 demonstrates that some nanoparticles coated on proppants by mineral oil or glycol can fixate formation fines in the proppant bed of fractures or gravel pack. In a somewhat similar way, U.S. Patent Application No. 2009/0266766 discloses a method and composition of using a nanoparticle-treated sand bed to purify waste water.

In more detail, nano-sized particles such as magnesium oxide (MgO) may be used to fixate or filter out fine solids such as clay, feldspars, calcium carbonate, barite, and quartz in particle packs or beds to inhibit, restrain or prevent them from moving on with a surfactant-laden fluid. Some nano-sized particles, also called nanoparticles herein, not only have high surface areas compared to their small sizes, but also have relatively high surface charges that permit them to associate or connect other particles together, including other charged particles, but also other non-charged particles. In one non-limiting embodiment, these associations or connections between the fines and the nano-sized particles are due to electrical attractions and other intermolecular forces or effects.

Laboratory tests have demonstrated that relatively small amounts of MgO nanoparticles can fixate and flocculate dispersed clay particles, and charged and non-charged colloidal silicas. Other nanoparticles such as ZnO, $Al_2O_3$, zirconium dioxide ($ZrO_2$), $TiO_2$, cobalt (II) oxide (CoO), nickel (II) oxide (NiO), and pyroelectric and piezoelectric crystals may also be used in the methods and compositions herein.

The nanoparticles may be directly placed or coated dry onto substrate particles or sand in a pack or bed or coated onto the substrate using a coating agent to filter out fine solids during these separation and recycling procedures. In one embodiment, a mixture of a coating agent and nanoparticles at least partially coats the selected substrate particles to filter out fine solids within a particle pack or other porous media, or separate out the fine solids from moving through with the surfactant-containing fluid being filtered. If substrate particles are at least partially coated with the coating agent and the nanoparticles, then the fine solids may be held within the particle pack and thus filtered out from the treated fluid.

The base fluid or carrier fluid of the fluid being treated by the methods herein (i.e. spent or used treatment fluids such as fracturing fluids, gravel pack fluids, spacer fluids, wellbore cleanup fluids, proppant pack cleanup fluids, filtration bed cleanup fluids, and the like) may be water-based, alcohol-based, solvent-based or oil-based, but in most expected embodiments is expected to be water-based. The carrier fluid or aqueous-based fluid may be brine. In non-limiting embodiments, the brines may be prepared using salts including, but not necessarily limited to, one or more of NaCl, KCl, $CaCl_2$, $MgCl_2$, $NH_4Cl$, $CaBr_2$, NaBr, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The base fluid or carrier fluid may also include components typical for treatment fluids, such as salts, oxidizers, enzymes, polymers, crosslinkers, pH buffers, surfactants, viscoelastic surfactants, corrosion inhibitors, scale inhibitors, chelants, biocides, preservatives, dispersants, anti-oxidants, reducing agents, sugars, alcohols, mutual solvents, defoamers, friction reducers, metals, resins, curing agents, non-emulsifiers, relative permeability modifiers, gas hydrate inhibitors, and the like.

Suitable nanoparticle coating agents, optionally used to help the particulate additives (e.g. nanoparticles) adhere to the substrate particles (e.g. sand) include, but are not necessarily limited to, water, brine, alcohols, glycols, solvents, mineral oil or other hydrocarbon that accomplishes the purposes of the methods and compositions described herein. Specific, non-limiting examples of suitable mineral oils include ConocoPhillips PURE PERFORMANCE® Base Oil, such as 225N and 600N oils; ConocoPhillips ULTRA-S™ oils, such as ULTRA-S™ 2, and ULTRA-S™ 4; Penreco DRAKEOL® oils, such as DRAKEOL® 21, DRAKEOL® 35 and DRAKEOL® 600; and ExxonMobil EXXSOL™ and NORPAR™ mineral oils, such as EXXSOL™ 80, EXXSOL™ 110, NORPAR™ 12 and NORPAR™ 15. Non-limiting examples of alcohols include, but are not necessarily limited to, methanol, ethanol, propanol, and the like. Non-limiting examples of glycols include, but are not necessarily limited to, ethylene glycol, diethylene glycol, polyethylene glycol, propylene glycol, dipropylene glycol, polypropylene glycol, and the like. Non-limiting examples of polyols include, but are not necessarily limited to, solutions of sorbitol, mannitol, fructose, glucose, galactose, lactose, sucrose, xylitol, maltitol, glycerol, and the like. Examples of alkyl carbonates include, but are not necessarily limited to, propylene carbonate and ethylene carbonate. Examples of organic solvents include, but are not necessarily limited to, xylene, toluene, acetone, methyl acetate, ethyl benzoate, limonene, and the like. It is expected that a sufficient filtering particle pack will include nanoparticles in the coating agent oil, for instance about 1 to 15 wt % nano-sized MgO particles in the 600N mineral oil. This coating composition may be used alone or may be added to an aqueous base fluid in a relatively small amount, in one non-limiting embodiment, from about 5 to about 100 gptg. It has been discovered that during mixing, the particulate additive composition (e.g. the nanoparticles in oil) will plate out on or at least partially coat the substrate particles, such as sand. That is, in cases where the base fluid is aqueous, the hydrophobic oil will be repulsed by the water and will coat the substrate particles (e.g. gravel, ceramic beads, etc.). How much coating of the particles that occurs is concentration dependant, based on both the amount of substrate particles used and the amount and type of the relatively smaller particulate additive used. In a non-limiting example the coating composition may additionally have a surfactant present, such as an oil-wetting surfactant like sorbitan monooleate (i.e. SPAN 80 from Uniqema), to improve and/or enhance the oil-wetting of the substrate particles by the particulate additives. In another non-limiting example the presence of a surfactant may preferentially reduce the thickness of the 600N mineral oil layer on the substrate particles. A reduced oil layer thickness may enhance nanoparticle exposure on substrate particles. Other agents besides SPAN 80 may be employed to optimize the oil coating or wetting on substrate particles, agents including, but not necessarily limited to: sorbitan esters, ethoxylated sorbitan esters, ethoxylated alcohols, ethoxylated alkyl-phenols, alkyl-dicarboxylics, sulfosuccinates, phospholipids, alkyl-amines, quaternary amines, alkyl-siloxanes, and the like. It is not necessary that a resin be used as a coating agent or binder, and in one non-limiting embodiment, no resin is used.

For recharging the particle bed or pack, there may be cases where an oil, even the more environmentally acceptable oils like pharmaceutical grade mineral oil or food grade plant oils, may not be desired for re-treating (i.e. replating or recoating) the particle bed or pack with nanoparticles. In such cases other coating agents may be used, which include but are not limited to: water, brines, glycols, alcohols, polyols, syrups, and combinations thereof. In non-limiting examples, brines including 2% bw KCl, 9% bw KCl, 21% bw $CaCl_2$ and the like may be used. Non-limiting examples of glycols include monopropylene glycol, dipropylene glycol, monoethylene glycol, and the like. Non-limiting examples of alcohols include propanol, ethanol, methanol and the like. Non-limiting examples of polyols include mannitol, sorbitol, glycerol, xylitol, and the like. Non-limiting examples of syrups include corn syrup, cane syrup, sorghum syrup, and the like.

It is theorized that the nanoparticles remain on the substrate particles primarily by electrostatic and other charges between the nanoparticle and substrate particle surfaces, however, other attractions or coupling forces may exist to initially and over the long-term keep the nanoparticles coated on the substrate particles. The inventors do not want to be limited to any particular theory. It is suspected that in most conditions the oil carrier fluid only assists the initial coating process of the nanoparticles on to the substrate particles. However, other agents may be added to the oil carrier fluid that may further enhance the initial and/or long-term nanoparticle attraction to the quartz, glass, ceramic and the like substrate particles composition. Additionally, the surface of the substrate particles, or a select amount of substrate particles, may be treated with agents that may improve the overall attraction of the nanoparticles to the substrate particles.

Nano-sized particles of alkaline earth metal oxides, alkaline earth metal hydroxides, transition metal oxides, transition metal hydroxides, post-transition metal oxides, and post-transition metal hydroxides, piezoelectric crystals, pyroelectric crystals, and mixtures thereof have been discovered to have particular advantages for at least partially removing the fine solids from the fluid being filtered. Specific types of particles in each of these categories are noted below and elsewhere, but it will be appreciated that any compound in these categories that can perform the necessary functions is included herein even though it has not been specifically mentioned.

Magnesium oxide particles and powders have been suitably used to remove fine solids. However, it will be appreciated that although MgO particles are noted throughout the description herein as one representative or suitable type of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, piezoelectric crystals, pyroelectric crystals, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, post-transition metal hydroxide, piezoelectric crystal, and pyroelectric crystal.

By "post-transition metal" is meant one or more of aluminum, gallium, indium, tin, thallium, lead and bismuth. In another non-limiting embodiment herein, the nano-sized particles are oxides and hydroxides of elements of Groups IIA, IVA, IIB and IIIB of the previous IUPAC American Group notation. These elements include, but are not necessarily limited to Mg, Ca, Ti, Zn and/or Al.

The nano-sized particulate additives herein may also be piezoelectric crystal particles (which include pyroelectric crystal particles). Pyroelectric crystals generate electrical charges when heated and piezoelectric crystals generate electrical charges when squeezed, compressed or pressed.

In one non-limiting embodiment, specific suitable piezoelectric crystal particles may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, PbZrTiO3, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these other crystals are generally not water soluble.

In one non-limiting explanation, when the aqueous carrier fluid mixed with very small pyroelectric crystals, such as nano-sized ZnO, is employed at conditions of high temperature and/or pressure, the pyroelectric crystals are heated and/or pressed and high surface charges are generated. These surface charges permit the crystal particles to associate, link, connect or otherwise relate the fine solids together to fixate them together and also to the surrounding substrate surfaces. The association or relation of the fine solids is thought to be very roughly analogous to the crosslinking of polymer molecules by crosslinkers, in one non-limiting image.

In one non-limiting embodiment, the nano-sized solid particulates and powders useful herein include, but are not necessarily limited to, alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In an alternate embodiment herein, the nano-sized particulate additives may have a second utility attraction or holding function that may further improve what materials may be removed from or changed in the base-fluid to be re-used; that is, after nanoparticle addition onto the particulate substrate another alternative or second functional particle may be attracted to and uniquely held by the nanoparticle coating. Non-limiting examples are zeolites, activated carbon, nanofibers, carbon nanotubes, functionalized carbon nanotubes, graphene, graphene oxide, functionalized graphene or graphene oxide, functionalized clays, nano-sized gold, silver, palladium, platinum and the like metal particles, metal doped zeolites, alkaline earth metal peroxides, and the like and combinations thereof. The alternate or second functional particulate held by the nano-sized solid particulates may have a range of utility for engineering re-use of the base carrier fluid to be filtered; such as select polymer and/or hydrocarbon removal, polymer and/or hydrocarbon alteration, biofilm prevention, aid organic particulate removal, select cation removal, and the like.

In another non-limiting embodiment, the mean particle size of the particulate additives and agents is 1000 nm or less and alternative ranges between about 1 nanometer independently up to about 500 nanometers. In another non-limiting embodiment, the mean particle size ranges between about 4 nanometers independently up to about 500 nm, alternatively up to about 100 nanometers. In another non-restrictive version, the particles may have a mean particle size of about 250 nm or less, in a different version about 100 nm or less, alternatively about 90 nm or less, and in another possible version about 50 nm or less, alternatively 40 nm or less. Within the context herein, "independently" and "alternatively" mean that any lower threshold may be combined with any upper threshold for a particular range type.

The amount of nano-sized particles in the carrier fluid may range from about 20 to about 500 pptg (about 2.4 to about 60 kg/1000 liters). Alternatively, the lower threshold of the proportion range may be about 50 pptg (about 6 kg/1000 liters), while the upper threshold of proportion of the particles may independently be about 300 pptg (about 36 kg/1000 liters) pptg.

The nano-sized particles herein may be added to a mineral oil or other hydrocarbon as the carrier fluid—a synergistic combination which also serves to initially coat, or at least partially coat, the nanoparticles to the sand or substrate particles, which are then placed or formed into a particle pack. In another non-limiting embodiment, the nano-sized particles coated on substrate particles, beads or sand herein may be added to an aqueous fluid during a treatment. In a non-limiting embodiment, the substrate particles bearing the comparatively smaller particulate additives may be passed through the fluid to be filtered in addition to or alternatively to passing the fluid over a particle pack or bed. For recharging substrate particles already in place, a variety of treatment fluids may be used with a variety of components. For example, to re-treat substrate particles in a bed, a light brine containing nanoparticles may be used. Optionally, additives like surfactants, polymers, and the like may be used in the re-treatment fluid.

It has been discovered that nano-sized particles like MgO may be used to remove contaminants such as clay and non-clay particles from liquids, that is, to remove, reduce or rid them from being present in the fluid, such as water. Again, some nanoparticles not only have high surface areas compared to their small sizes, but also have relatively high surface charges that permit them to associate, link or connect other particles together, including other charged particles, but also other non-charged particles. In one non-limiting embodiment, these associations or connections between the contaminant particles and the nano-sized particles are due to electrical attractions and other intermolecular forces or effects as previously noted.

Laboratory tests have demonstrated that relatively small amounts of MgO nanoparticles can remove and separate dispersed clay particles from a fluid containing a surfactant. These are the same kinds of nanoparticles described previously with respect to fines fixation.

The nanoparticles may be applied as dry powder directly to and placed on and in a dry substrate particle pack. Alternately, the nanoparticles may be added and suspended in water to place on and in a dry or wet substrate pack. In one embodiment, a mixture of a coating agent and nanoparticles at least partially coats the selected sand bed or other porous media (substrate particles). If sand or gravel is at least partially coated with the coating agent and the nanoparticles, then the contaminants and impurities may be removed from the fluid, e.g. spent fracturing fluid that has had the viscosity reduced or broken, recovered nano- and/or micro-emulsion drilling mud cleanup fluid, recovered cement spacer/wash fluid, and thus the contaminants and impurities may be eliminated or reduced thereby purifying the recovered treatment fluid.

The amount of nano-sized particles in the sand or ceramic bed pack material may be from about 1 pound of nanoparticles for about 200 pounds to 5000 pounds of sand. It will be appreciated that any other unit of weight may be used, for instance, from about 1 gram of nanoparticles for about 200 grams to 5000 grams of sand. In an alternate embodiment, the nanoparticles are present in an amount of from about 1 part by weight nanoparticles to about 1000 independently to about 2000 parts sand or ceramic pack material.

The nano-sized particles herein may be added to water, a glycol, alcohol, polyol, olefin, vegetable oil, fish oil, or mineral oil, or mixtures of these, as the carrier fluid—a combination which also serves to initially coat, or at least partially coat, the nanoparticles to the sand or ceramic beads. In another non-limiting embodiment, the nano-sized particles coated on ceramic particles or sand herein may be added to an aqueous fluid during a treatment.

The sand, ceramic, glass or other substrate particles of the optional pack or bed may have a mean particle size of the particles of from about 10 mesh to about 325 mesh (about 2000 microns to about 45 microns), in one non-limiting embodiment. Alternatively, the substrate particles may range in size from about 20 mesh independently to about 200 mesh (from about 850 microns independently to about 75 microns). The substrate particle size range may be wide, such as from about 40 mesh to about 200 mesh (from about 425 microns to about 250 microns), or the particle size range may be relatively narrow, such as from about 20 mesh to about 40 mesh (from about 850 microns to about 425 microns).

Laboratory tests have shown that 35 nanometer MgO particles and monopropylene glycol (PG) coated on a 20/40 mesh (850/425 micron) sand pack can successfully remove contaminants from wastewater.

While the methods and structures herein are sometimes described typically herein as having use in wastewater fluids, such as those from paper processing, the compositions and methods are also expected to be useful in oil field recovery, e.g. produced formation water, exhausted drilling muds, metal-working, agricultural operations, mining operations, environmental remediation operations, waste disposal operations, cleaning operations, manufacturing operations and the like.

The regeneration, reclamation, or recharging of nanoparticle-bearing substrate particles, whether or not they are structured into substrate beds or sand packs, involves a one step and optionally a two-step treatment with acids. A goal is to substantially remove the nanoparticles or other particulate additives, including the fine solids or contaminants thereon, that is, associated with the substrate particles or the sand through the action of the nanoparticles. By "substantially remove" is meant in one non-limiting embodiment at least 50% of the nanoparticles and/or the fine solids/contaminants, alternatively at least 75% of the nanoparticles and/or the fine solids/contaminants, and in another non-restrictive version at least 95% of the nanoparticles and/or the fines/contaminants. Of course, removing all (100%) of the nanoparticles and/or the fines/contaminants would be ultimately desirable, but this may not be practical because of the difficulties of ensuring that all the nanoparticles and/or the fine solids/contaminants are contacted with the acids. It will be appreciated that "remove" encompasses removing the nanoparticles and the fine solids/contaminants by dissolving them, as well as other chemical and/or physical relocation processes.

The particle pack is contacted with a first acid, which may be an inorganic acid, an organic acid, or mixtures thereof—except that hydrofluoric acid (HF) is not used. Optionally, the particle pack is subsequently contacted with a second acid that includes HF, but may optionally include any other inorganic or organic acids, even the same as those used in the first contacting. HF is introduced, injected or pumped into the particle bed second to dissolve clays and quartz and to avoid forming $CaF_2$ and $MgF_2$ precipitates.

Suitable inorganic acids for recharging particle packs include, but are not necessarily limited to, hydrochloric acid, phosphorous acid, phosphonic acid, sulfuric acid, sulfonic acid and mixtures thereof. Suitable organic acids for recharging particle packs include, but are not necessarily limited to, acetic acid, formic acid, glutaric acid, succinic acid, and adipic acid, oxalic acid (ethanedioic acid), malonic acid (propanedioic acid), pimelic acid (heptanedioic acid), and mixtures thereof. The mixture of dicarboxylic acids glutaric acid, succinic acid and adipic acid is known as HTO (high temperature organic) acid. Further details about HTO acid may be found in U.S. Pat. No. 6,805,198, incorporated by reference herein in its entirety.

It will be appreciated that when contacting the particle pack with the first acid and optional second acid there needs to be contact for a period of time greater than merely briefly so that the acids have time to contact and dissolve the nanoparticles and/or the fine particulates (e.g. fines or contaminants). However, an exact time period for contacting any particular particle pack will vary depending on a wide variety of interdependent factors, and thus such periods are difficult to predict in advance. For instance, the nature of the particle pack, including the nature of the substrate particles (e.g. sand, gravel, ceramic beads, glass beads, etc.), the nature of the nanoparticles, the nature of the fine solids (e.g. contaminants, etc.), the amount of fine solids (e.g. how "loaded" the particle pack is, or how close to being "full" or saturated the particle pack is with the fine solids), the size of the particle pack, the mechanism for delivering the acid, the temperatures and pressures involved in recharging the particle pack, etc., all affect the "soak" time. Nevertheless, to give some idea of typical soak times for the entire acid treatment, the particle pack may contact the fluid from about 15 minutes to about 3 hours, in another non-limiting embodiment from about 0.5 hour to about 1 hour. The soak time for first acid ranges from about 5 minutes to about 1 hour, and soak time for second acid from about 10 minutes to about 2 hours.

How much acid is needed may be roughly estimated. For the first step acid, the amount of nanoparticles used for the previous treatment is known and the amount of expected fine solids (e.g. carbonate particles) from the formation based on core analysis may be estimated. For the second step acid, based on the strength of HF used, one to three pore volumes (pore volume of the substrate pack) of the acid is needed or helpful.

In one non-limiting embodiment, the concentration of acid in the first acid treatment may be about 10% or less, alternatively about 5% or less. The amount of HF in the second acid treatment is low, for instance about 2% or less, alternatively about 1% or less. However, as noted, other acids may also be present together with HF in the second acid treatment and these other non-HF acids may be present in an amount of about 10% or less.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, combinations of substrate particles, particulate additives, nanoparticles, coating agents, fluids being filtered, acid treating conditions, recharging conditions, acids, and other components and conditions falling within the claimed parameters, but not specifically identified or tried in a particular method or composition, are anticipated to be within the scope of this invention. Further, when a fluid is being filtered to separate fine solids from a fluid, in particular one containing a surfactant, it is not necessary that the separation be complete (100% fine solids removal) for the method to be considered a success, although removing as much of the fine solids as possible from the fluid is certainly a goal.

The present invention may suitably comprise, consist or consist essentially of the elements disclosed and may be practiced in the absence of an element not disclosed. For instance, the method for filtering a fluid may consist of or consist essentially of water, at least one surfactant and fine solids, and/or the method may consist or consist essentially of contacting the fluid with substrate particles bearing comparatively smaller particulate additives thereon, thereby removing at least a portion of the fine solids therefrom to give a filtered fluid containing the surfactant, where the particulate additives are present in an amount effective to remove at least a portion of the fine solids.

The words "comprising" and "comprises" as used throughout the claims is to interpreted "including but not limited to".

What is claimed is:

1. A method for filtering a fluid comprising water, at least one surfactant and fine solids, the method comprising contacting the fluid with substrate particles bearing comparatively smaller particulate additives thereon, thereby removing at least a portion of the fine solids therefrom to give a filtered fluid containing the surfactant, where the particulate additives are present in an amount effective to remove at least a portion of the fine solids from the fluid, where the particulate additives:
   have a mean particle size of 1000 nm or less, and
   are selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof.

2. The method of claim 1 where the surfactant is a viscoelastic surfactant and the fluid is gelled with the viscoelastic surfactant in an amount effective to gel the aqueous fluid and the method further comprises breaking the gel of the gelled fluid prior to or simultaneously with contacting the fluid with the substrate particles.

3. The method of claim 1 where the surfactant is an emulsifier and the fluid is a nano- and/or micro-emulsion wellbore and/or reservoir cleanup fluid.

4. The method of claim 1 where the surfactant is a detergent and the fluid is a wellbore and/or reservoir cleanup fluid.

5. The method of claim 1 where:
the alkaline earth metal is selected from the group consisting of magnesium, calcium, strontium, and barium,
the alkali metal is selected from the group consisting of lithium, sodium, potassium,
the transition metal is selected from the group consisting of titanium and zinc, and
the post-transition metal is aluminum, and mixtures thereof.

6. The method of claim 1 where the substrate particles are selected from the group consisting of sand, gravel, ceramic beads, glass beads, and combinations thereof.

7. The method of claim 1 further comprising at least partially coating the substrate particles with a coating agent comprising a carrier fluid selected from the group consisting of water, brine, alcohol, glycol, polyol, solvents, vegetable oil, mineral oil, and combinations thereof, and the particulate additive.

8. The method of claim 1 where the effective amount of the particulate additives ranges from about 1 part by weight particulate additive for about 200 to about 5000 parts by weight of the substrate particles.

9. The method of claim 1 where the mean particle size of the substrate particles ranges from about 10 mesh to about 325 mesh (about 2000 microns to about 45 microns).

10. The method of claim 1 where a second functional particulate is included on the substrate particles for removing contaminants from the recovered treatment fluid.

11. The method of claim 10 where the second functional particulates are selected from the group consisting of zeolites, activated carbon, nanofibers, carbon nanotubes, functionalized carbon nanotubes, graphene, graphene oxide, functionalized graphene or graphene oxide, functionalized clays, nano-sized gold, silver, palladium, platinum and the like metal particles, metal doped zeolites, alkaline earth metal peroxides, and combinations thereof.

12. The method of claim 1 further comprising re-using the filtered fluid containing the surfactant in an operation selected from the group consisting of:
introducing the filtered fluid downhole in a wellbore as a spacer or wash fluid ahead of introducing cement for cementing casing in the wellbore;
adding an acid to the fluid and introducing the filtered fluid downhole in a wellbore to contact a subterranean formation as matrix acidizing fluid;
adding an acid to the fluid and introducing the filtered fluid downhole in a wellbore to contact a subterranean carbonate reservoir;
adding an acid to the fluid and introducing the filtered fluid downhole in a wellbore before, during or after perforating a subterranean formation to open up the perforations near the wellbore;
not necessarily in any order: diluting the fluid, adding a polymer to the fluid, and introducing the filtered fluid downhole in a wellbore for slickwater fracturing a subterranean formation;
introducing the filtered fluid downhole in a wellbore as a preflush and/or as a postflush ahead of and/or behind, respectively, introducing a crosslinked polymer-gelled fluid and/or a VES-gelled fluid; and
combinations thereof.

13. A method for filtering a fluid comprising water, at least one surfactant and fine solids, the method comprising:
contacting the fluid with a particle pack comprising substrate particles and comparatively smaller particulate additives, where the particulate additives:
have a mean particle size from about 4 nm to about 500 nm, and
are selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof; and
removing at least a portion of the fine solids therefrom to give a filtered fluid containing the surfactant, where the particulate additives are present in the particle pack in an amount effective to remove at least a portion of the fine solids.

14. The method of claim 13 where the surfactant is a viscoelastic surfactant and the fluid is gelled with the viscoelastic surfactant in an amount effective to gel the aqueous fluid, where the method further comprises breaking the gel of the gelled fluid prior to or simultaneously with contacting the fluid with the particle pack.

15. The method of claim 13 where
the alkaline earth metal is selected from the group consisting of magnesium, calcium, strontium, and barium,
the alkali metal is selected from the group consisting of lithium, sodium, potassium,
the transition metal is selected from the group consisting of titanium and zinc, and
the post-transition metal is aluminum, and mixtures thereof.

16. The method of claim 13 where the particle pack comprises substrate particles selected from the group consisting of sand, gravel, ceramic beads, glass beads, and combinations thereof.

17. The method of claim 13 further comprising at least partially coating the substrate particles with a coating agent comprising a carrier fluid selected from the group consisting of water, brine, alcohol, glycol, polyol, solvents, vegetable oil, mineral oil, and combinations thereof, and the particulate additive.

18. The method of claim 13 where the effective amount of the particulate additives ranges from about 1 part by weight particulate additive for about 200 to about 5000 parts by weight of the particle pack.

19. The method of claim 13 where the mean particle size of the substrate particles in the particle pack ranges from about 10 mesh to about 325 mesh (about 2000 microns to about 45 microns).

20. The method of claim 13 further comprising re-using the filtered fluid containing the surfactant in an operation selected from the group consisting of:
introducing the filtered fluid downhole in a wellbore as a spacer or wash fluid ahead of introducing cement for cementing casing in the wellbore;
adding an acid to the fluid and introducing the filtered fluid downhole in a wellbore to contact a subterranean formation as matrix acidizing fluid;
adding an acid to the fluid and introducing the filtered fluid downhole in a wellbore to contact a subterranean carbonate reservoir;
adding an acid to the fluid and introducing the filtered fluid downhole in a wellbore before, during or after perforating a subterranean formation to open up the perforations near the wellbore;

not necessarily in any order: diluting the fluid, adding a polymer to the fluid, and introducing the filtered fluid downhole in a wellbore for slickwater fracturing a subterranean formation;

introducing the filtered fluid downhole in a wellbore as a preflush and/or as a postflush ahead of and/or behind, respectively, introducing a crosslinked polymer-gelled fluid and/or a VES-gelled fluid; and combinations thereof.

21. A method for filtering an aqueous fluid gelled with at least one viscoelastic surfactant in an amount effective to gel the aqueous fluid and further comprising fine solids, the method comprising:

contacting the fluid with a particle pack comprising substrate particles and comparatively smaller particulate additives, where the particulate additives:

have a mean particle size of 1000 nm or less, and are selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, pyroelectric crystals, and mixtures thereof;

breaking the gel of the gelled fluid prior to or simultaneously with contacting the fluid with the particle pack;

removing at least a portion of the fine solids therefrom to give a filtered fluid containing the surfactant, where the particulate additives are present in the particle pack in an amount effective to remove at least a portion of the fine solids; and reusing the filtered fluid containing the surfactants.

* * * * *